Sept. 19, 1950  J. H. ANDERSON  2,523,086
SAW RAKER TOOTH GAUGE
Filed Nov. 27, 1946

Inventor
John H. Anderson

By *Clarence A. O'Brien and Harvey B. Jacobson*
Attorneys

Patented Sept. 19, 1950

2,523,086

UNITED STATES PATENT OFFICE 2,523,086

SAW RAKER TOOTH GAUGE

John H. Anderson, San Francisco, Calif.

Application November 27, 1946, Serial No. 712,674

4 Claims. (Cl. 33—202)

This invention relates to new and useful improvements in raker tooth gages and more particularly to a device adapted for use in connection with the sharpening and swaging of saw teeth.

The primary feature of this invention is to provide a gage of the character referred to adapted to discover irregularities in the cutting edges of saws, said gage being particularly adapted for use in gaging circular saws.

Another important feature of this invention is to provide a device of this character having an adjustable, resilient bearing plate adapted to rest on the edges of the teeth of a saw.

A further feature of this invention is to provide a gage of this character that is neat and attractive in appearance, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
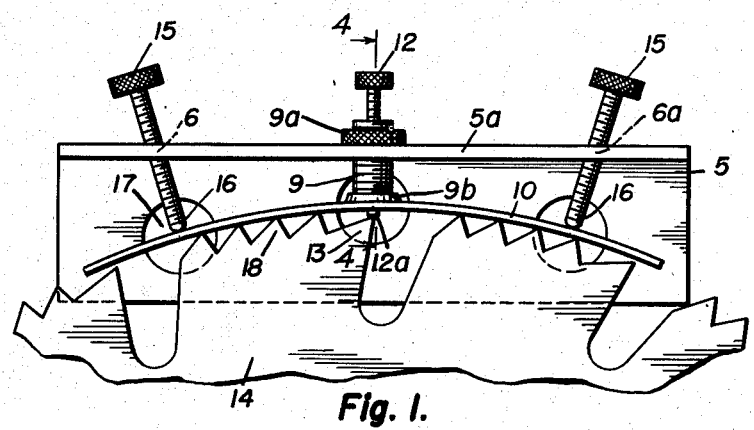
Figure 1 is a front view of the gage applied to a portion of a circular saw blade.
Figure 2:
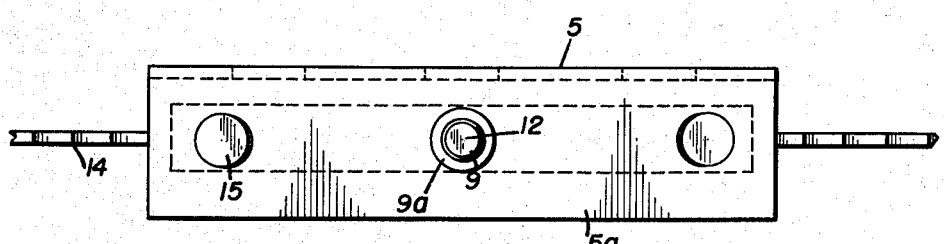
Figure 2 is a top plan view thereof.
Figure 3:
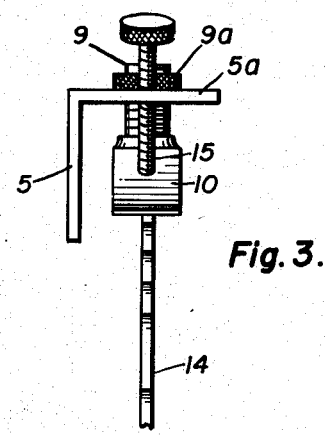
Figure 3 is an end view of the gage applied to a portion of a circular saw blade.
Figure 4:
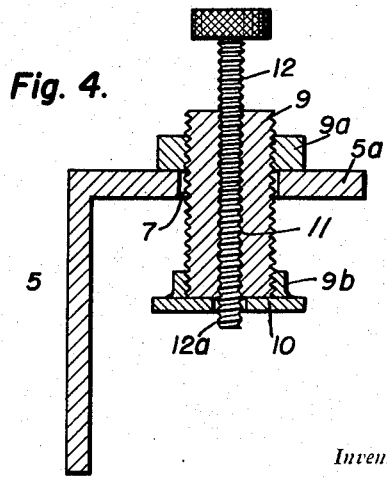
Figure 4 is an enlarged sectional view taken on a line 4—4 of Figure 2.

Referring now to the drawing in detail, wherein for the purpose of illustration, I have disclosed a preferred embodiment of the invention, the numeral 5 represents an angle iron having a pair of inwardly inclined threaded openings 6 and 6a at the ends of the horizontal flange 5a of said angle iron.

An opening 7 is provided in the center of horizontal flange 5a, said opening 7 adapted to freely receive the lower threaded end of a set screw 9 which is provided with a knurled nut 9a at its upper end bearing against the flange 5a.

The lower end of said screw 9 is threaded in a boss or the like 9b which is welded or otherwise suitably secured to a longitudinal resilient gage plate 10.

An internally threaded bore 11 is provided in set screw 9, said bore adapted to receive a gage screw 12 which is adjustable vertically in screw 9, the lower end 12a of screw 12 extending freely through plate 10 and bearing against the upper edge of a raker tooth 13 of a circular saw 14.

A pair of set screws 15 are threaded in openings 6 and 6a in angle iron 5 and said screws 15 are inclined inwardly so that the lower ends 16 of said screws bear against the upper faces of plate 10. In this maner, by adjusting set screws 9 and 15, the curvature of plate 10 can be regulated to conform to the curvature of the cutting edge of the saw blade 14.

The angle iron 5 is provided with circular sight openings 17. The gage screw 12 is turned in screw 9 so that the lower end 12a of screw 12 extends downwardly from plate 10 the gaging distance desired. Screws 15 are turned downwardly in openings 6 and 6a so that their lower ends 16 cause plate 10 to curve to conform to the curvature of the cutting teeth 18 of blade 14.

If the raker tooth 13 of blade 14 is gaged correctly the lower end 12a of screw 12 will bear lightly on the raker tooth, however should the tooth be too high plate 10 will not rest on the cutting teeth of the blade, and if the raker tooth 13 is too low the lower end 12a of screw 12 will not bear on said raker tooth.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. In a gage for saws, an angle iron having its upper flange horizontal, an opening centrally located in the upper horizontal flange of said angle iron, a vertically adjustable set screw freely carried in said opening, a resilient elongated gage plate adjustable vertically by said set screw and having an internally threaded boss fixed thereto and receiving engaging said set screw, a second set screw threaded axially through the first named set screw and extending downwardly through the resilient plate, said second named set screw adapted to bear against the upper end of a raker tooth of a saw blade for gaging said raker tooth, and a pair of set screws carried by the angle iron and adjacent the end edges of the horizontal flange of said angle iron, said pair of set screws carried by said horizontal flange for engaging the resilient plate to adjust the curvature of said plate to conform to the curvature of the cutting edge of the saw blade.

2. In a gage for saws, an angle iron having its upper flange horizontal, an opening centrally located in the upper horizontal flange of said angle iron, a vertically adjustable set screw slidable in said opening, a resilient gage plate adjustable vertically by said set screw and having an internally threaded boss fixed thereto and receivably engaging the set screw, a second set screw threaded axially through the first named set screw and extending downwardly through the resilient plate, said second named set screw engageable with the upper end of a raker tooth of a saw blade for gaging said raker tooth, and a pair of radially disposed set screws carried by the horizontal flange of the angle iron, the lower ends of said set screws bearing against the resilient gage plate on opposite sides of the first named set screw, to adjust the curvature of the gage plate to conform to the cutting edge of the saw blade.

3. A circular saw gage comprising an angle iron member including a vertical flange and a horizontal flange, a resilient gage plate, manually adjustable means connecting the gage plate to the underside of the horizontal flange for flexing the gage plate to conform to the curvature of the cutting edge of a saw, and an adjustable gage member carried by the horizontal flange and projecting through the plate for gaging one of the teeth of the saw, said means including a set screw, said horizontal flange having an opening therein slidably receiving the set screw, and an internally threaded boss fixed to said gage plate and receivably engaging said set screw, said set screw having an internally threaded axial bore receiving said gage member.

4. A circular saw gage comprising an angle iron member including a vertical flange and a horizontal flange, a resilient gage plate, a center adjusting screw connecting the gage plate to the underside of the horizontal flange, said horizontal flange having an opening slidably receiving said adjusting screw, an internally threaded boss fixed to said gage plate receivably engaging the adjusting screw, a pair of adjusting screws carried by the horizontal flange adjacent the ends thereof and engaging the gage plate adjacent the ends of the latter to adjust the plate to conform to the curvature of the cutting edge of a saw, and a gage screw adjustable axially of the center adjusting screw and projecting through the gage plate into gaging position with one of the saw teeth of a saw.

JOHN H. ANDERSON.

REFERENCES CITED

The following references are of record in the file of this patent:

UNITED STATES PATENTS

| Number | Name | Date |
|---|---|---|
| 658,274 | Morin | Sept. 18, 1900 |
| 948,594 | Morin | Feb. 8, 1910 |
| 1,330,042 | Knizek | Feb. 3, 1920 |
| 1,373,719 | Gibbs | Apr. 5, 1921 |
| 1,479,318 | Pistemaa | Jan. 1, 1924 |
| 1,741,850 | LaBare | Dec. 31, 1929 |
| 1,862,531 | Englund | June 14, 1932 |
| 2,112,432 | Bauman | Mar. 29, 1938 |

FOREIGN PATENTS

| Number | Country | Date |
|---|---|---|
| 347,409 | Germany | Jan. 20, 1922 |